United States Patent [19]

Grandi

[11] Patent Number: 5,086,834
[45] Date of Patent: Feb. 11, 1992

[54] APPARATUS FOR STORING AND HEATING FOOD PRODUCTS

[76] Inventor: Renë Grandi, Loudon Ruy, Bourgoin-Jallieu 38300, France

[21] Appl. No.: 656,190
[22] PCT Filed: Sep. 13, 1989
[86] PCT No.: PCT/FR89/00461
 § 371 Date: Mar. 11, 1991
 § 102(e) Date: Mar. 11, 1991
[87] PCT Pub. No.: WO90/02509
 PCT Pub. Date: Mar. 22, 1990

[30] Foreign Application Priority Data

Sep. 14, 1988 [FR] France ............... 88/12073

[51] Int. Cl.⁵ ............................... A47J 39/02
[52] U.S. Cl. ................... 165/135; 165/48.1; 219/386
[58] Field of Search ............ 165/48.1, 135, 918, 165/919; 312/236; 219/386, 387

[56] References Cited

U.S. PATENT DOCUMENTS

| 3,291,546 | 12/1966 | Traycoff . | |
|---|---|---|---|
| 3,784,787 | 1/1974 | Shevlin | 219/386 |
| 3,897,989 | 8/1975 | Grandi | 312/236 |
| 3,908,749 | 9/1975 | Williams | 165/2 |
| 4,005,745 | 2/1977 | Colato et al. | 165/2 |
| 4,167,983 | 9/1979 | Seider et al. . | |
| 4,235,282 | 11/1980 | deFlippis et al. | 165/61 |
| 4,256,952 | 3/1981 | Thomas et al. | 219/521 |

FOREIGN PATENT DOCUMENTS 0046414 2/1982 European Pat. Off. .
2285836 4/1976 France .
2386291 11/1978 France .

Primary Examiner—Allen J. Flanigan
Attorney, Agent, or Firm—Sandler, Greenblum & Bernstein

[57] ABSTRACT

Apparatus for reheating meal trays standing by in a refrigerated housing to permit individual heating of the trays. The apparatus includes a heating support receiving the trays of which an area remains always cold and of which an area is intended to reheat a plate contained in the tray. This heating support includes electric resistance elements which are covered with a horizontal insulating heat barrier. By introducing the tray, the thermal barrier is pushed by a buffer, which thermal barrier is retracted in the heating support by compression of springs which, after removal of the tray, expand and reposition the thermal barrier to cover the electrical resistance elements, thereby avoiding residual calories heating the plate to effect the refrigerated atmosphere of the housing. This residual heat is evacuated outside the housing through a vent which was covered by a protrusion on the heat barrier obstructing the vent while the barrier was pushed by the tray.

20 Claims, 3 Drawing Sheets

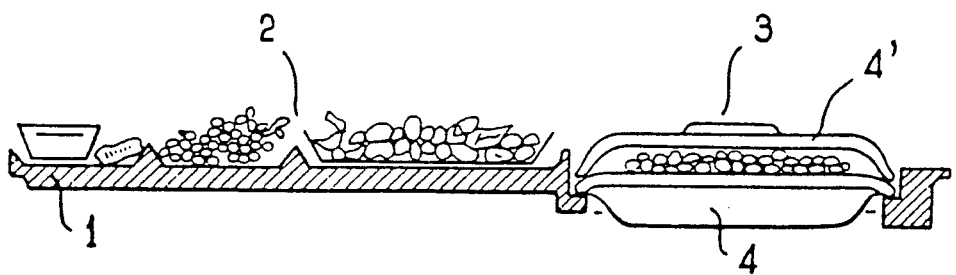
FIG_1
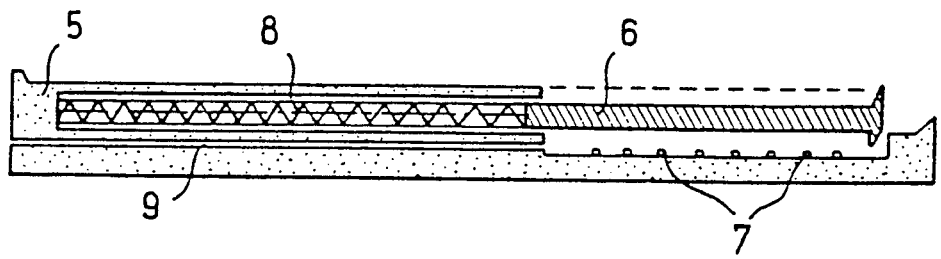
FIG_2
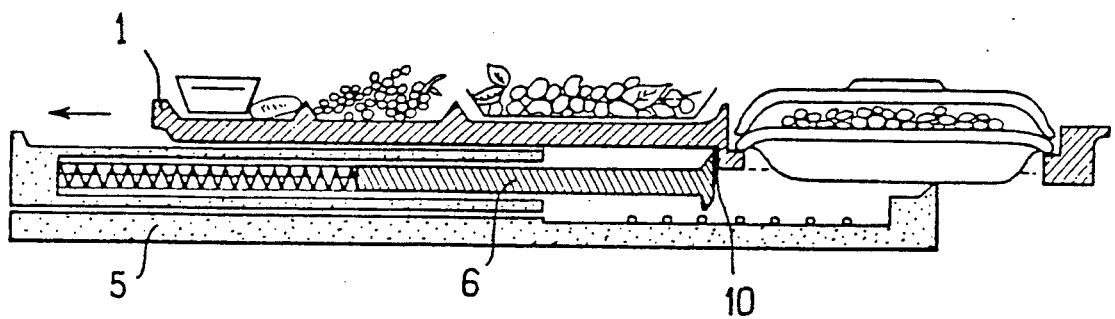
FIG_3
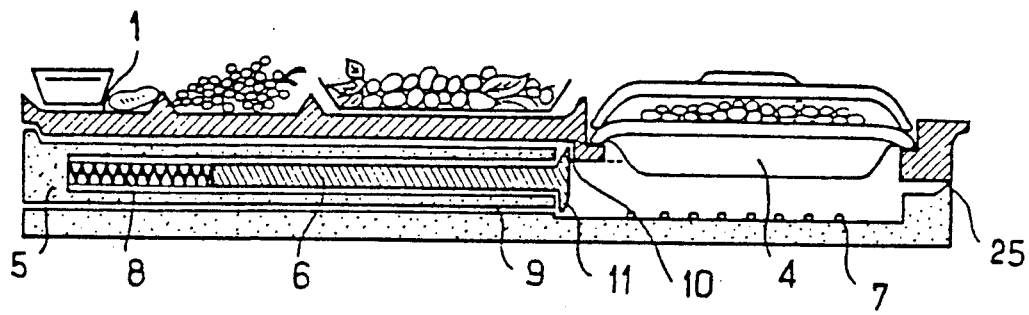
FIG_4

APPARATUS FOR STORING AND HEATING FOOD PRODUCTS

FIELD OF THE INVENTION

This invention is directed to apparatus for storing and heating food products.

DISCUSSION OF BACKGROUND AND MATERIAL INFORMATION

In known apparatus for storing and heating food products, trays with integrated resistance heating element are used, that have the disadvantage of being extremely expensive. Moreover, these trays are heavy, and preclude the use of disposable trays. Other apparatus include heat barriers that separate the products to be reheated from the refrigerated products, but these heat barriers do not function individually for each tray. Instead, they function all at once in the apparatus, and for all the trays, at the same time. This has the disadvantage of requiring the heating of all the trays at the same time, and thus, not permitting the heating of one individual tray in accordance with requirements, and keeping the heated trays waiting in a refrigerated atmosphere.

These latter apparatus may be appropriate for mass distribution of meals in trays at the same time, because there would not arise the situation of keeping plates waiting to be heated in a refrigerated atmosphere, without having to remove the tray, before it is brought to an appropriate temperature and is distributed, even though the resistance heating element of the trays are individual, the heat from these is communicated to the neighboring trays.

The cold air flow being stopped at this moment, this results is a quick rise in temperature in the refrigerated atmosphere, even though the resistance elements of all the trays were not subject to electric current. French Patent FR-A-2,285,836 describes a system which includes a refrigerated housing containing supports for meal trays, equipped with heating areas for selectively reheating some plates at a given moment. However, once the meal tray has been removed, these heating areas do not become cold instantaneously, and the residual heat must be compensated with introduction of kilogram cooling addition cooling heat, which diminishes the overall efficiency of the installation.

The apparatus, according to the invention eliminates all of these disadvantages enables, the use of disposable trays made of plastic, ABS, polystyrene, cardboard or any other "ephemeral" products, and it enables each tray to be reheated individually or at together at the same time.

SUMMARY OF THE INVENTION

The apparatus, according to the invention, is composed of a refrigerated housing in which heating supports are placed in racks for trays containing complete meals with food products that need to remain cold, and one or two dishes, that are to be heated. Each heating support includes an electrical resistance element at one or two portions, that enables the tray to be heated in those areas that are placed on this heating support.

These electrical resistance elements are covered with mobile and horizontal heat barriers that are pushed into the heating support by the introduction of the tray, thereby uncovering, the resistance elements which can then be placed under current, in accordance with the information that will have been transmitted to it by the electronic console, in order to heat the desired plate.

Once the user has removed the tray, the heat barrier once again covers the resistance elements and isolation the residual heat produced, thereby ensuring that this residual heat does not spread throughout the refrigerated housing.

At the moment that this isolation occurs, the electrical resistance elements are no longer under current.

The heat barrier is constituted of a strong, high-density heat insulation, whose to and fro movement is easy to manoeuver; a mortise on each side with springs enables the heat barrier to be brought back over the resistance elements when the tray is removed.

The loading phases of the refrigerated housing are done in the following way:

1. By the introduction of trays on their supports, manually, or by a trolley or "rack" in which the trays and the heating supports are already stacked.

2. The tray, sliding on the support, pushes the heat barrier with a buffer, and retracts it by compressing the release springs. The tray is thus positioned definitively, and a notch or a hook located on the front of the heating support stops the tray from sliding back.

3. Each tray thus remains in the refrigerated and ventilated housing, all the food products remaining advantageously cold, including those products that are waiting to be heated and that are covered by a highly insulated, bell shaped cover that also acts as a heat barrier between the hot plate and the cold atmosphere of the refrigerated housing.

However, since the trays can be introduced into the device several hours before the heating of the appropriate plate, all the food products placed on this tray, including cold food products (hors d'oeuvres, desserts, etc.) as well as the dishes to be heated are kept cold; this is advantageous for avoiding the growth of bacteria.

4. The heating area awaits instructions from the electronic control console, as regards each tray, and in order to subject the electrical resistance elements in the heating support uncovered by the heat barrier, to application of electrical current.

The time period and the temperature is preselected on the console of the refrigerated housing.

Contactors located on the heating support stop the resistance elements from heating in the absence of a tray, even if a false signal from the electric console were to be received.

Diodes, which light to indicate the heating process are placed on the support and enable this heating process to be checked.

When the food products located under the bell-shaped covers on the tray are heated, the other products on the tray remain refrigerated by virtue of the general system of the housing.

Each resistance element is auto-regulated once the heat barrier is retracted and the tray is positioned appropriately.

In order to avoid transmitting heat to the cold products, and to the refrigerated housing, the heating area is highly insulated, not only in the bell-shaped cover but also, under the resistance elements and around the heating supports.

This insulation is done by highly insulating materials that separate the heating area from the refrigerated area.

Any heat losses that could occur, would be recycled and refrigerated by a special device intended to restore the temperature of the refrigerated housing.

5. At the moment when the trays are removed, the heat barrier is released, and with the help of its spring, returns to cover and partition the heating area of the tray support, and thus, stops the residual heat from being diffused in the refrigerated housing even though the resistance elements no longer receive current. This also prevents the cold products on the other trays in the refrigerated housing from being affected.

The return of the heat barrier enables the electric supply of the resistance to be cut off with the help of the contactor located on the heating support. This represents an additional security measure, in addition to the information given by the electronic console.

6. Once the tray has been removed, the heat barrier, coming back once again to cover the resistance elements, uncovers an orifice that it had been obstructing with a protrusion, when it was pushed and retracted.

This orifice serves to evacuate the residual heat confined between the heat barrier and the tray support. This orifice evacuates and released the heat via a vent tube, outside the refrigerated housing and the trolley.

BRIEF DESCRIPTION OF THE DRAWINGS

The annexed drawings, that represent a non-limiting example of the embodiments of this invention, illustrate the object of this invention.

FIG. 1 represents a sectional side view of a single tray.

FIG. 2 represents a sectional side view of a single heating support.

FIG. 3 represents a sectional side view of a tray sliding onto the heating support.

FIG. 4 represents a sectional side view of a tray positioned on the heating support.

DETAILED DESCRIPTION OF THE PREFERRED EMBODIMENTS

Figure 5:
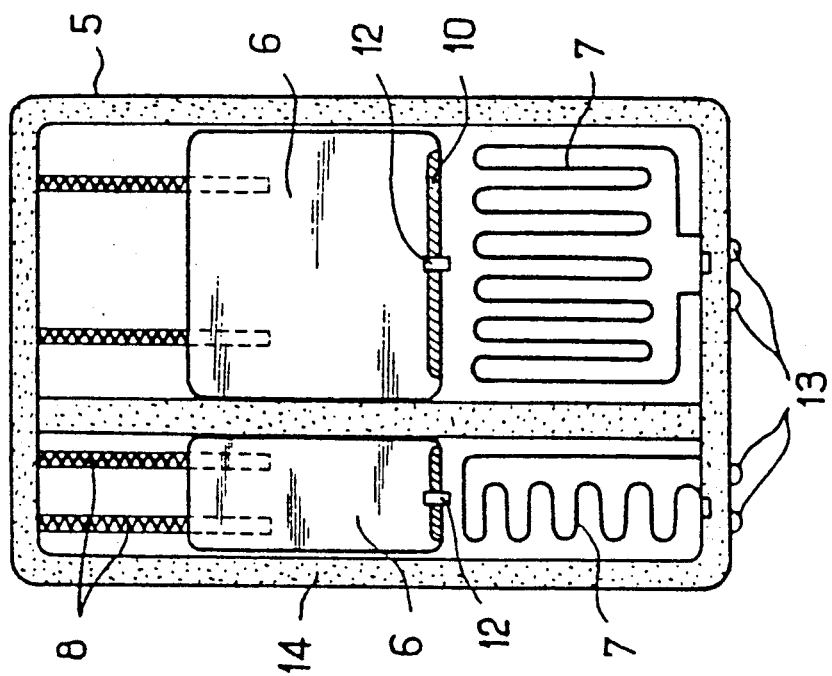
FIG. 5 represents an elevational view of the heating support, with two heat barriers covering the electric resistance element.

The tray 1 represented in FIG. 1, includes an area 2 where the products always remain refrigerated and an area 3, consisting of a plate 4, and its bell-cover 4' where the products are to be reheated at a given time.

FIG. 2 consists of the heating support 5, in the absence of a tray. The heat barrier 6 covers the electric resistance element 7, the springs 8 enable the retraction and return of the heat barrier when the tray is removed.

The orifice 9 enables the evacuation of the residual heat when the heat barrier 6 once again covers the electric resistance element.

FIG. 3 represents a tray 1, in the process of being introduced onto the heating support 5, pushing the heat barrier 6 with a buffer 10, which barrier is retracted in the heating support.

FIG. 4 represents tray 1, in its final position on the heating support 5, the springs 8 being compressed by the heat barrier 6, which is completely retracted. A notch or nook 25, located on the heating support, stops the tray from sliding in a backward direction.

A protrusion 11, located on the heat barrier, obstructs orifice 9 for the evacuation of the heat, in order that heat does not escape during the process of heating the plate 4.

In FIG. 5, the heat barrier 6 of the heating support 5, once again covers the resistance elements of the two heating areas. The springs 8 are relaxed. Contactors 12, located on the heating barriers 6 and on the periphery of the heating support 5, indicate the absence of a tray, this step constituting a security measure in order to ensure that the resistance elements no longer receive electric current. Luminous indicators 13 enable the heating area to be checked.

An adequately strong insulation 14 separates the cold areas from the heating area.

Figure 6:
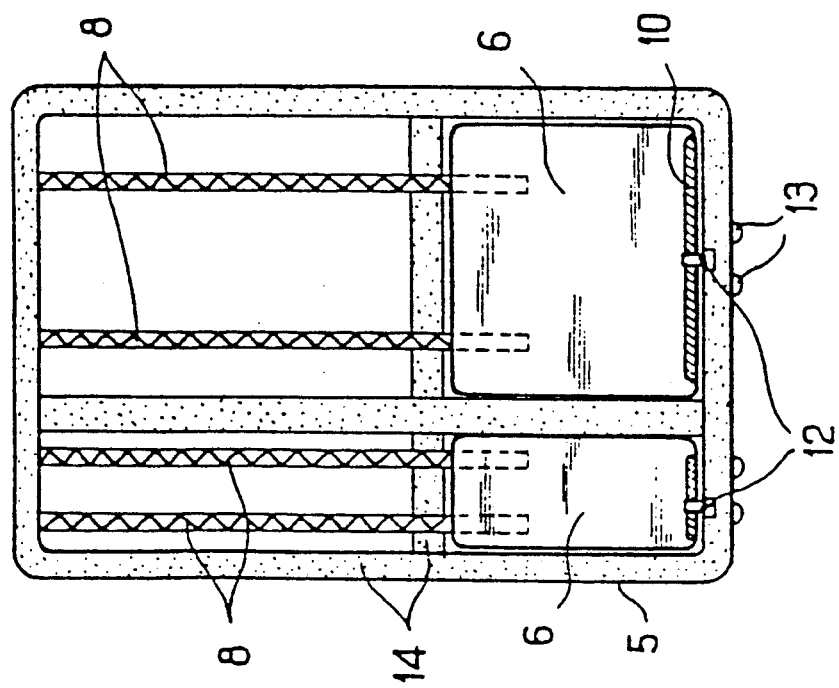
FIG. 6 represents an elevational view of the heating support with the thermal barriers retracted due to the presence of a tray (not shown), thereby uncovering the electric resistance element.

Heating barriers 6 of heating support 5 in FIG. 6 are pushed by tray 1 (not shown), with the help of buffers 10, springs 8 being totally compressed. Resistance elements 7 are then energized in accordance with the programmed information.

Figure 7:
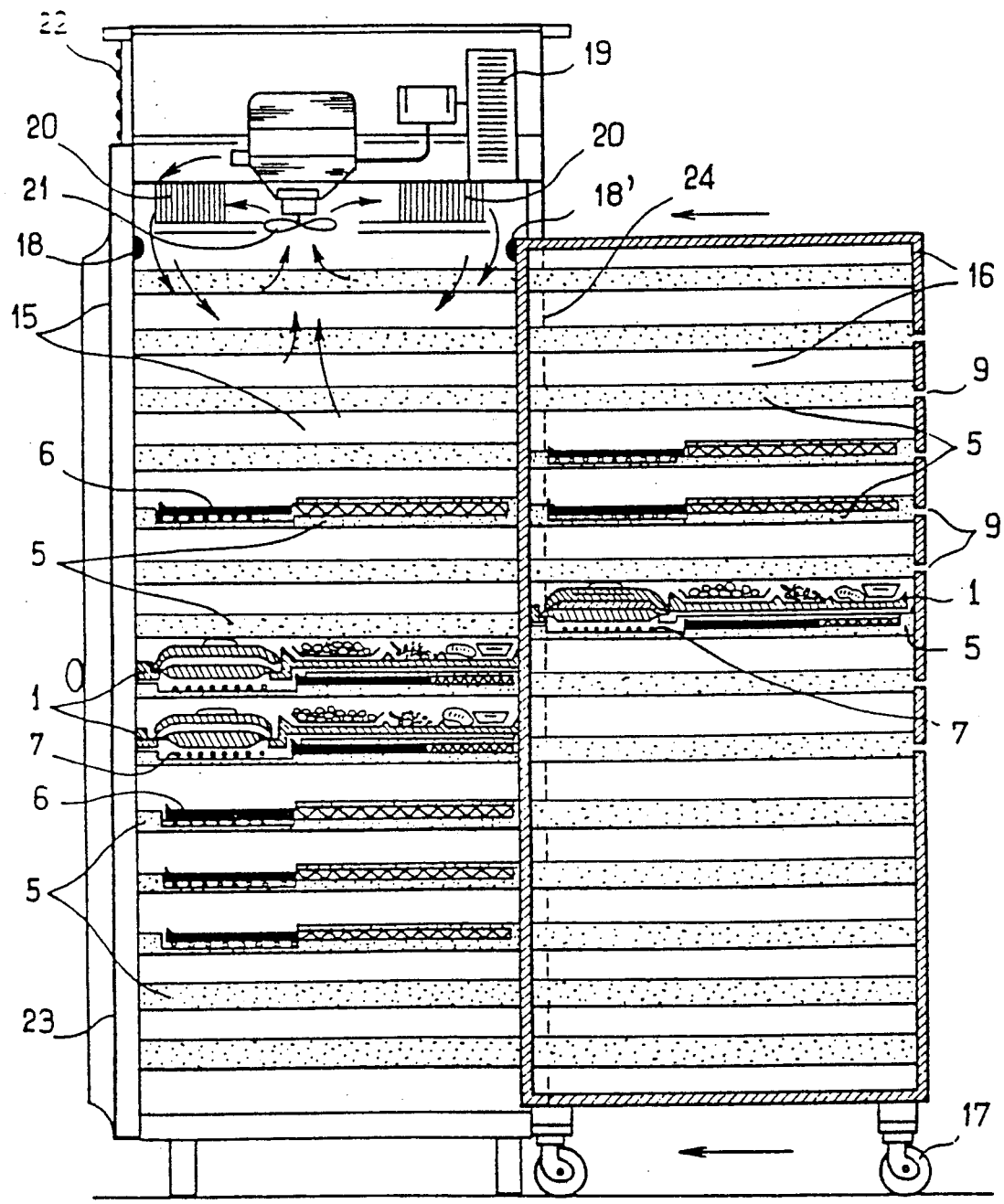
FIG. 7 represents the refrigerated housing with some examples of the heating supports and the trays. This Figure also represents a trolley consisting of some examples of heating supports and of trays, that are in the process of being introduced into the refrigerated housing.

FIG. 7 represents a refrigerated housing 15, and a trolley 16 or "rack", ready to be introduced into the refrigerated housing.

The refrigerated housing could either be used alone or along with trolley 16 or "rack".

The heating supports 5 in the refrigerated housing are permanent, and are ready to receive trays 1. These trays are introduced manually on the heating supports 5, one by one, the heat barriers 6 are thus pushed and retracted, according to the invention that has just been described, and the whole assembly then awaits information from a console 22, located on the refrigerated housing, in order that the resistance element 7 of the heating support 5 receive electricity.

By using the trolley 16, the latter being previously equipped with heating supports 5 on which are also stacked the trays 1, the whole assembly, trolley, heating supports, and trays, are thus introduced with the help of casters 17, into the refrigerated housing 15, which in this case, is empty, and completely free from shelving.

Contactors 18 and 18', located in the housing, and on the trolley, enable electrical contact to be established so that the resistance element 7 may commence the heating process.

The use of the trolley enables the refrigerated housing to be loaded advantageously, either from the front 23 of this housing or from the rear 24. The rear loading 24, does not disturb the disengagement of the front opening of the housing, and thus offers improved service to the user. The trolley may also be stocked, and heated in a traditional cold chamber.

A refrigerating system including a condenser 19, evaporator 20, and circulating fan 21 refrigerates the housing, with the air being continuously recycled by fan 21.

The entire refrigerating assembly is located on the refrigerated housing and in case of a break-down, it can be easily removed, either to be repaired, or to be replaced.

However, the embodiments, the arrangements as well as the means implemented may be varied by substituting other known equivalents, without in any way altering either the spirit or the conception of the invention that has just been described.

I claim:

1. Apparatus for storing and reheating food products in a refrigerated housing, comprising:
   at least one heating support;
   at least one electrical resistance element within said at least one heating support;
   a substantially horizontal and movable insulating heat barrier associated with each of said at least one heating support, with said heat barrier being retractable from a first position over said at least one electrical resistance element within the heating support to a second, retracted position at another portion of the heating support when subjected to a push by introduction of a tray.

2. The apparatus according to claim 1, wherein said heat barrier includes a buffer adapted to be contacted by introduction of the tray to assist pushing of said heat barrier to said second, retracted position.

3. The apparatus according to claim 1, further including spring means for returning said heat barrier to said first position upon removal of the tray.

4. The apparatus according to claim 1, wherein each said at least one heating support includes vent means for permitting residual heat to be evacuated from each said at least one heating support.

5. The apparatus according to claim 4, wherein said heat barrier includes sealing means for obstructing said vent means when said heat barrier is in said second, retracted position, while opening said vent means when said heat barrier returns to said first position.

6. The apparatus according to claim 1, wherein each said at least one heating support includes hook means for preventing sliding of the tray.

7. The apparatus according to claim 1, further including contact means in each said at least one heat support for permitting flow of electricity to said at least one electrical resistance element when a tray is detected as being substantially fully in position over said at least one electrical resistance element.

8. The apparatus according to claim 7, further including indicator lights for indicating when electricity is flowing to said at least one electrical resistance element.

9. Apparatus for storing and reheating food products in a refrigerated housing, comprising:
   at least one tray capable of holding food products for cooling and heating;
   at least one heating support;
   at least one electrical resistance element within said at least one heating support;
   a substantially horizontal and movable insulating heat barrier associated with each said at least one heating support, with said heat barrier being retractable from a first position over said at least one electrical resistance element within the heating support to a second, retracted position at another portion of the heating support when subjected to a push by introduction of a tray.

10. The apparatus according to claim 9, where each said at least one tray includes at least two portions, one for maintaining food products cold and another for heating food products.

11. The apparatus according to claim 10, wherein said another portion for heating food products includes a recessed portion for holding a plate above said at least one electrical resistance element when said heat barrier is in its second position.

12. The apparatus according to claim 11, further including a plate, and a cover for said plate.

13. The apparatus according to claim 9, wherein said heat barrier includes a buffer adapted to be contacted by introduction of the tray to assist pushing of said heat barrier to said second, retracted position.

14. The apparatus according to claim 9, further including spring means for returning said heat barrier to said first position upon removal of the tray.

15. The apparatus according to claim 9, wherein each said at least one heating support includes vent means for permitting residual heat to be evacuated from each said at least one heating support.

16. The apparatus according to claim 15, wherein said heat barrier includes sealing means for obstructing said vent means when said heat barrier is in said second, retracted position, while opening said vent means when said heat barrier returns to said first position.

17. The apparatus according to claim 9, wherein each said at least one heating support includes hook means for preventing sliding of the tray when in position over said at least one electrical resistance element in said heating support.

18. The apparatus according to claim 17, wherein each said at least one tray includes corresponding means for preventing sliding of the tray.

19. The apparatus according to claim 9, further including contact means in each said at least one heat support for permitting flow of electricity to said at least one electrical resistance element when a tray is detected as being substantially fully in position over said at least one electrical resistance element.

20. The apparatus according to claim 19, further including indicator lights for indicating when electricity is flowing to said at least one electrical resistance element.

* * * * *